United States Patent [19]

Kinouchi

[11] Patent Number: 4,794,897
[45] Date of Patent: Jan. 3, 1989

[54] ENGINE CONTROL SYSTEM OF MARINE OUTBOARD ENGINE

[75] Inventor: Sosuke Kinouchi, Kakogawa, Japan

[73] Assignee: Kawasaki Jukogyo Kaisha, Hyogo, Japan

[21] Appl. No.: 118,042

[22] Filed: Nov. 9, 1987

[30] Foreign Application Priority Data

Nov. 12, 1986 [JP] Japan ................................ 61-173824

[51] Int. Cl.$^4$ ........................ F02B 77/08; F01P 11/16; F01M 1/18; F02P 5/145
[52] U.S. Cl. ........................... 123/198 D; 123/41.15; 123/196 S; 123/335
[58] Field of Search ............ 123/41.15, 196 S, 198 D, 123/198 DB, 198 DC, 335

[56] References Cited

U.S. PATENT DOCUMENTS

| | | | |
|---|---|---|---|
| 3,533,391 | 10/1970 | Lockmuller | 123/41.15 X |
| 4,147,151 | 4/1979 | Wright | 123/41.15 X |
| 4,459,951 | 7/1984 | Tobinaga et al. | 123/41.15 X |
| 4,557,224 | 12/1985 | Du Bois | 123/198 D X |
| 4,562,801 | 1/1986 | Koike | 123/198 D X |

FOREIGN PATENT DOCUMENTS 0085210 5/1985 Japan .

*Primary Examiner*—Willis R. Wolfe
*Attorney, Agent, or Firm*—Wenderoth, Lind & Ponack

[57] ABSTRACT

An engine control system of a marine outboard engine has an oscillator which operates in response to an abnormality signal resulting from detection signals from an oil level sensor and a temperature sensor, and in response to a signal from a tachometric sensor to transmit normal and retarded ignition signals alternately and repeatedly to a firing timing control circuit, which thereupon controls the engine ignition with normal firing timing when receiving the normal ignition signal and with retarded firing timing when receiving the retarded ignition signal. The engine power output under retarded firing time is lower than that under normal firing timing, whereby the engine emits an abnormal humming sound, warning the operator that an abnormal condition has occurred.

5 Claims, 1 Drawing Sheet

ENGINE CONTROL SYSTEM OF MARINE OUTBOARD ENGINE

BACKGROUND OF THE INVENTION

This invention relates generally to so-called "outboard motors" or units each comprising an engine, a propeller, a mechanism for transmitting the engine power to the propeller, auxiliary devices, and a frame for supporting and holding together these parts as a unit. This unit, which will hereinafter be referred to as an outboard engine, is mountable in a freely dismountable manner on a stern part of a boat or like marine surface vessel. More particularly, the invention relates to a system for controlling the engine of an outboard engine.

In general, reduction of the size and weight of an outboard engine is sought by using a simple internal-combustion engine such as, for example, a two-stroke-cycle engine having a separate lubrication system and means for introducing cooling water from the outside. Such an engine, however, is accompanied by risks such as deficiency of lubricating oil due to carelessness on the part of the operator or clogging of the cooling water inlet by foreign matter. Accordingly, it has heretofore been a practice to provide a warning lamp or a buzzer to warn the operator when the quantity of the lubricating oil falls below a minimum level or when the engine overheats thereby to prevent oil shortage or overheating. These measures, however, have not been fully effective in cases such as that wherein the operator fails to notice the warning indication and thereby does not reduce the engine speed.

Accordingly, in a known engine for marine use, means are provided to compulsorily reduce the engine speed prior to the occurrence of the above described abnormalities during navigation over water (as disclosed in, for example, Japanese patent application Laid-Open (Kokai) No. 85210/1985). In this technique, however, the engine speed is reduced by causing the ignition system of the engine to undergo repeated alternations of ignition and non-ignition. As a consequence, each spark plug is wetted by the liquid fuel at each instance of non-ignition, similarly as in the case of flooding due to excessive operation of the starter mechanism without ignition, whereby there is the possibility of misfiring.

SUMMARY OF THE INVENTION

This invention has been conceived and developed with the aim of overcoming the above described problems encountered in the prior art. Accordingly, it is an object of this invention to provide a system for controlling the engine of a marine outboard engine by which damage to the engine due to lubricating oil shortage and/or overheating can be promptly prevented, and at the same time, occurrence of defective ignition is also prevented.

In order to achieve the above stated object, this invention provides an engine control system comprising essentially an oil level sensor for detecting the state of the engine lubricating oil when its level has descended to its predetermined lower limit, a temperature sensor for detecting overheating of the engine, a tachometric sensor for detecting the engine rotational speed, an oscillator circuit, and an ignition timing or firing timing control circuit.

When the rotational speed signal from the tachometric sensor is above a predetermined value, the oscillator circuit operates in response to the detection output of either one of the oil level and temperature sensors to transmit repeatedly and alternately as output a normal ignition signal and a retarded ignition signal to the ignition timing control circuit which operates when it is receiving as input the normal ignition signal to cause sparking of a spark plug with the normal firing timing. When the ignition timing control circuit is receiving as input the abnormal or retarded ignition signal, it causes the spark plug to spark with a retarded firing timing at which the engine power output drops relative to that with normal firing timing.

According to this invention, in the event that, when the engine is operating at relatively high speed, the lubricating oil level drops below a prescribed lower limit, or the engine overheats, a normal ignition signal and a retarded ignition signal are repeatedly and alternately transmitted as output from the above described oscillator circuit. Upon receiving this alternating output, the above described control circuit causes the engine spark plug to spark repeatedly with normal firing timing and alternately with a retarded firing timing at which the engine power output drops relative to that at normal firing timing. As a consequence, the engine runs in an irregular state wherein it emits an abnormal humming sound, whereby the operator becomes aware of an abnormal operational condition, and can take a proper remedial measure.

The nature, utility, and further features of this invention will become more fully apparent from the following detailed description with respect to a preferred embodiment of the invention when read in conjunction with the accompanying drawings, briefly described below.

DETAILED DESCRIPTION OF THE INVENTION

Figure 1:
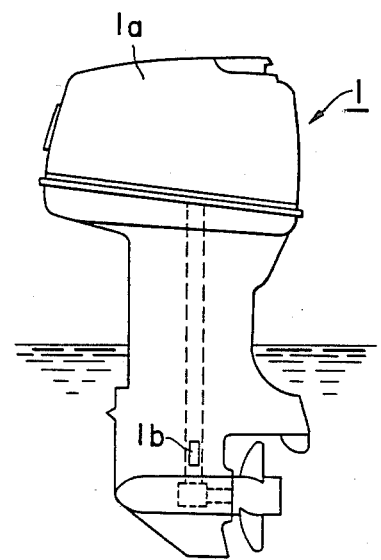
FIG. 1 is a port side elevation showing one example of a marine outboard engine to which the control system of this invention can be applied.

In a typical example of a marine outboard engine 1 as illustrated in FIG. 1, a two-stroke-cycle engine (not shown) is mounted on the upper part thereof and enclosed within a housing 1a. This engine is of the separate lubrication type wherein a mixture of fuel and air is drawn into the crankcase through a path at one part of which engine lubricating oil is supplied from an oil tank. The engine is cooled by cooling water introduced through a water intake port 1b formed at the lower part of the lower unit to introduce cooling water from the outside surrounding water into the water jacket of the engine.

Figure 2:
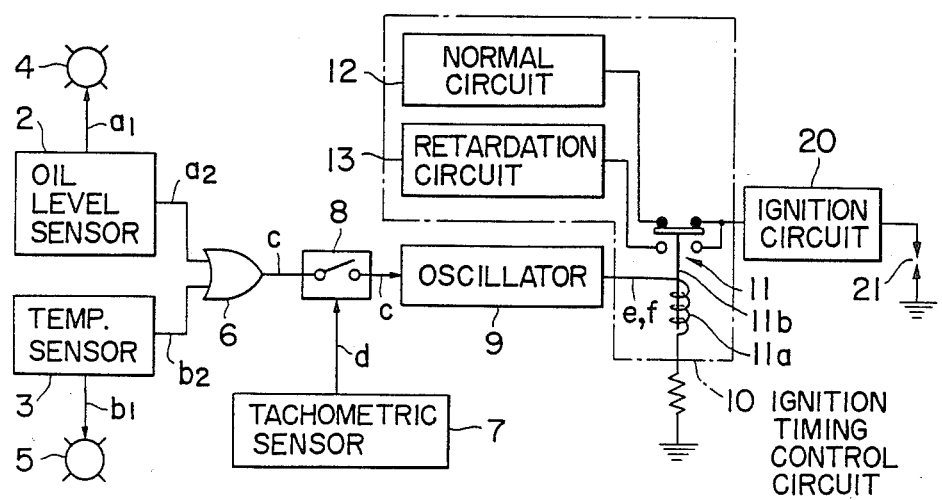
FIG. 2 is a circuit diagram, partly in block form, showing the essential organization of one example of the control system according to this invention.

Referring now to FIG. 2, the control system shown therein constitutes a preferred embodiment of the invention and operates in response to detection signals respectively from three sensors, namely, an oil-level sensor 2, a temperature sensor 3, and a rotational-speed or tachometric sensor 7.

The oil-level sensor 2 is provided in the above mentioned oil tank (not shown) and detects the state therein of the lubricating oil when its level reaches its lower limit, thereupon transmitting lower limit signals a1 and a2 respectively to a warning lamp 4 for low oil level and to an OR circuit 6 described hereinlater. The temperature sensor 3 is mounted on, for example, a wall surface of the above mentioned water jacket of the engine and detects the temperature of this wall surface. When this sensor 3 detects overheating, that is, the state of the wall surface wherein its temperature has reached a predetermined overheating temperature, in response it transmits overheating signals b1 and b2 respectively to a warning lamp 5 for overheating and to the above mentioned OR circuit 6. The warning lamps 4 and 5 are lit, of course, upon receiving the signals a1 and b1, respectively.

The above mentioned OR circuit 6 is adapted to receive the lower limit signal a2 or the overheating signal b2 and operates in response to at least one of these input signals to output an abnormality signal c.

The aforementioned tachometric sensor 7 is, for example, a tachometrical means provided on the engine crankshaft (not shown) or a sensor adapted to detect variations in the voltage of the pickup coil of the engine ignition system (not shown) and operates in response to the detection of the rotational speed of the engine to transmit a rotational-speed (tachometric) signal d to a switching circuit 8. This switching circuit 8 receives the tachometric signal d and operates when this signal indicates an engine rotational speed of, for example, 2,000 rpm or higher to close, thereby to transmit the above mentioned abnormality signal c to an oscillator 9.

Figure 3:
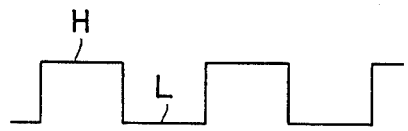
FIG. 3 is a graph showing the form of high/low rectangular pulses generated from the oscillator of the control system of this invention.

This oscillator 9 operates in response to the abnormality signal c to transmit a normal ignition signal e and a retarded ignition signal f to an ignition timing control circuit 10. In the instant example as illustrated in FIG. 3, the output of the oscillator 9 is in the form of high/low rectangular pulses. A high pulse of H level constitutes a retarded ignition signal f, while a low pulse of L level constitutes a normal ignition signal e. These rectangular pulse waves repeat H/L indications with a cyclic period, for example, of the order of 3 seconds.

The above mentioned ignition timing control circuit 10 comprises a changeover switch 11 having a movable contact 11b actuated by a coil 11a, a normal circuit 12, and a retardation circuit 13. The coil 11a is so connected to the output side of the oscillator 9 as to receive either of the normal ignition and retarded ignition signals e and f transmitted therefrom. The movable contact 11b is actuated by the coil 11a to move between two contacting positions, namely, one position for connecting the normal circuit 12 to an ignition circuit 20, the output side of which is connected to a spark plug 21, and a second position for connecting the retardation circuit 13 to the ignition circuit 20.

Thus, when the oscillator 9 sends an L-level, normal ignition pulse signal e, the switch 11 connects the normal circuit 12 to the ignition circuit 20. When the oscillator 9 transmits an H-level, retarded ignition signal f, the switch 11 connects the retardation circuit 13 to the ignition circuit 20.

In the instant example, the normal circuit 12 is in the form of a first pickup coil for causing the spark plug 21 to spark with the normal ignition timing of the engine, for example, at a cyclic point 110 degrees before opening of the exhaust port of the engine. On the other hand, the retardation circuit 13 is in the form of a second pickup coil for causing the spark plug 21 to spark at a cyclic point which is retarded to an ignition timing at which the engine power output drops greatly from that at the above mentioned normal ignition timing, for example, a point in the interval of from 5 degrees before the opening of the exhaust port of the engine to the instant of opening of the exhaust port.

The engine control system of the above described organization according to this invention operates in the following manner.

When the boat is under way and reaches a certain navigational speed, the operator sets the throttle at a constant opening setting thereby to run the boat at a constant speed. At this time, the switching circuit 8 is receiving a signal d from the tachometric sensor 7 indicating that the engine speed is 2,000 rpm or above and is therefore closed. Furthermore, the ignition circuit 20 is connected to the normal circuit 12 and causes the spark plug 21 to spark with the normal firing timing.

If, with the boat and the outboard engine in the above described operational state, the cooling water intake port 1b as shown in FIG. 1 becomes clogged by a foreign object, and the temperature of the water jacket wall rises, this temperature rise is detected by the temperature sensor 3, which thereupon transmits an overheating signal b2. Or, if the level of the engine lubricating oil in the oil tank reaches the lower limit of the prescribed quantity, this condition is detected by the oil level sensor 2, which thereupon transmits a lower limit signal a2.

When either one of the overheating signal b2 and the lower limit signal a2 is transmitted, the OR circuit 6 receiving this signal operates in response thereto to transmit an abnormality signal c by way of the switching signal 8 to the oscillator 9. The oscillator 9 thereupon produces output pulses of H·L rectangular waveform, that is, a retarded ignition signal f and a normal ignition signal e, which are transmitted alternately as input to the ignition timing control circuit 10. The control circuit 10 operates in response to these signals to connect alternately the retardation circuit 13 and the normal circuit 12, each for specific periods of time, to the ignition circuit 20 and hence to the spark plug 21.

As a consequence the engine undergoes a cyclic operation comprising a repeated alternation each of 3 seconds of a normal output operation (high-speed rotation) and a very low output operation (low-speed rotation) and thereby emits an abnormal humming sound. Upon hearing this sound, the operator immediately becomes aware of the irregular operational state of the engine and promptly lowers the engine speed, and subsequently he can inspect the outboard engine for the cause of the abnormality.

Thus, according to this invention, an irregular operation state of the engine is caused to occur, not by misfiring or non-ignition of the engine, but by a retardation of the ignition timing. Therefore, there is almost no possibility of wetting of the spark plug 21 by the fuel, whereby there is no possibility of poor ignition.

In the above described method of bringing about an irregular operational state, the length of the period during which the engine is run at normal output and the period for running with a greatly retarded ignition timing are required to be amply long, i.e., of an order such that the operator can sense the irregular operational state. Accordingly, the pitch of the rectangular pulse waves are ordinarily set at a value of the order of 2 to 5 seconds.

In this connection, the control system of this invention may be so adapted that the engine speed will be caused to drop automatically to 2,000 rpm by the continuation of the above described irregular operational state during a period of over ten seconds.

Furthermore, it is also possible to so adapt the control system that, when the engine speed increases and reaches a preset upper limit, the ignition timing control circuit 10 operates to perform an additional function as an over-run limiter.

The organization of the retardation circuit 13 used in the present invention is provided such that the engine ignition is positively carried out whenever it causes a great drop in the engine power output. The organization of the retardation circuit is not limited to the one described hereinbefore.

While the changeover switch 11 has been described in the above example and illustrated in FIG. 2 as being of a mechanical nature, it may be in some other form such as an electronic circuit.

As described above with respect to a preferred embodiment thereof, this invention provides a control system for an outboard engine by which, in the event of an abnormal operational condition such as inadequate lubrication and/or overheating, the engine is caused to run in an irregular state as a result of intermittent retardation of the ignition timing. Thus, misfiring or poor ignition of the spark plug is prevented.

What is claimed is:

1. A system for controlling an engine of a marine outboard engine, said system comprising:
    an oil level sensor for detecting the state of engine lubricating oil in the engine at a lower limit of a prescribed quantity thereof and for transmitting a corresponding first detection output;
    a temperature sensor for detecting overheating of the engine and for transmitting a corresponding second detection output;
    a tachometric sensor for detecting the rotational speed of the engine and for transmitting a corresponding third detection output;
    an oscillator circuit for, upon receiving as input any one of said first and second detection outputs when said third detection output corresponds to a predetermined value or higher value of the engine speed, operating to transmit as output repeatedly and alternately a normal ignition signal and a retarded ignition signal; and
    an ignition timing control circuit for receiving as input said normal and retarded ignition signals and for controlling ignition of the engine to conform to a normal ignition timing when receiving said normal ignition signal and to a retarded ignition timing producing an engine power output lower than that under the normal ignition timing when receiving said retarded ignition signal;
    whereby the engine operating at high speed undergoes irregular operation alternately with normal ignition timing and with retarded ignition timing, thereby to emit an abnormal humming sound when lubricating oil deficiency or engine overheating occurs.

2. A system as claimed in claim 1, wherein said ignition timing control circuit comprises a normal circuit, a retardation circuit, a changeover switch means operable between two conditions respectively for connecting either one of the outputs of said normal and retardation circuits to an output terminal of said ignition timing control circuit, and activating means operated in response to said normal ignition and retarded ignition signals to activate said changeover switch means into said two conditions.

3. A system as claimed in claim 1, further comprising an OR circuit receiving as input said first detection output and said second detection output, and an ON-OFF switching circuit to which the output of said OR circuit is transmitted and which receives as input said third detection output, the output of said ON-OFF switching circuit being transmitted as input to said oscillator circuit, said switching circuit being activated by said third detection output.

4. A system as claimed in claim 1, wherein said ignition timing control circuit is connected to an ignition circuit, which operates in response to either one of the outputs of said normal and retardation circuits to fire a spark plug of the engine with normal or retarded ignition timing.

5. A system as claimed in claim 1, further comprising respective warning means to which the outputs of said oil level sensor and said temperature sensor are transmitted.

* * * * *